Jan. 24, 1956
G. BREZA ET AL
2,731,869
CONTROLLING AND COMPENSATING APPARATUS
FOR LATHES AND THE LIKE
Filed March 6, 1951
6 Sheets-Sheet 1
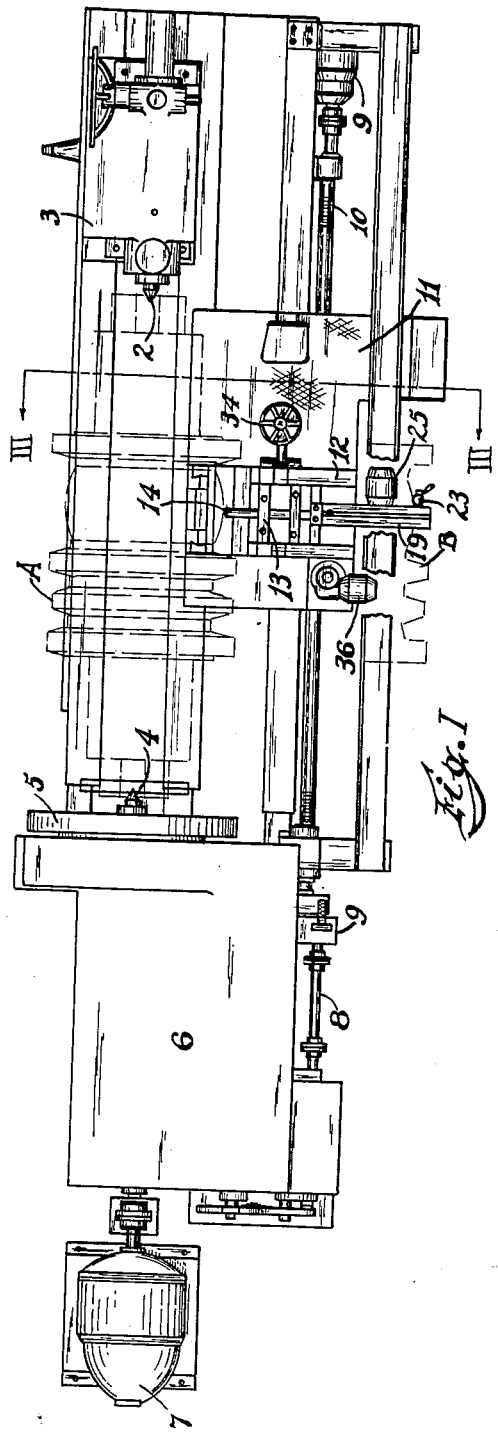
INVENTORS
George Breza AND
Finn B. Abramsen
by William B. Wharton
their attorney

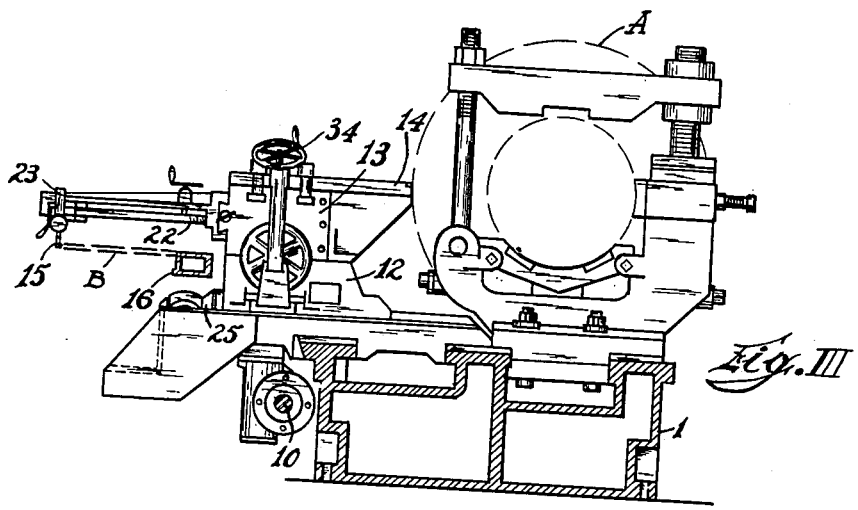
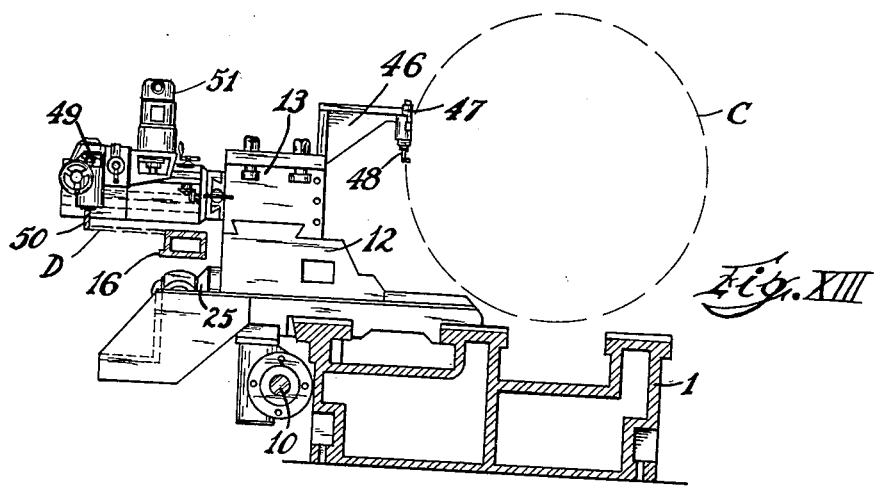
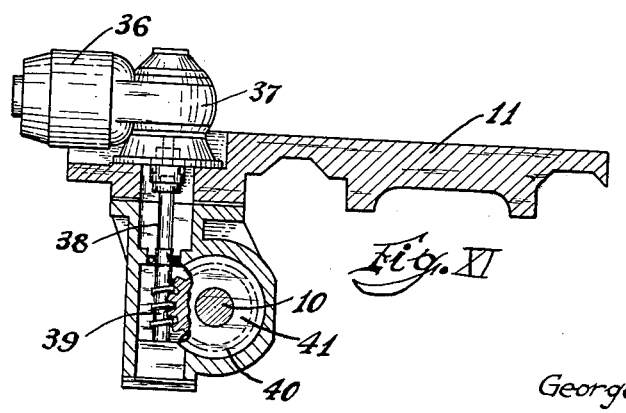

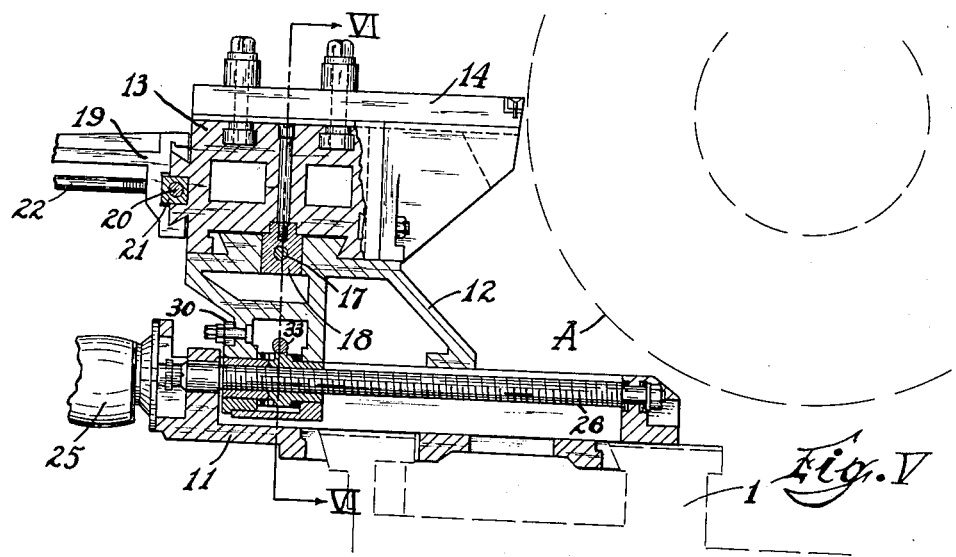
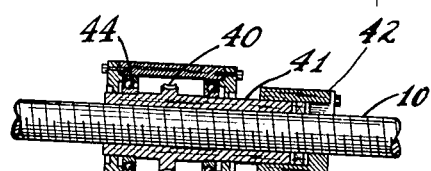
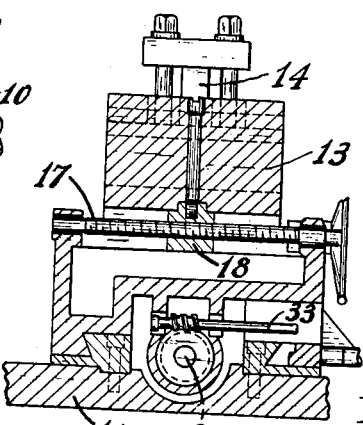
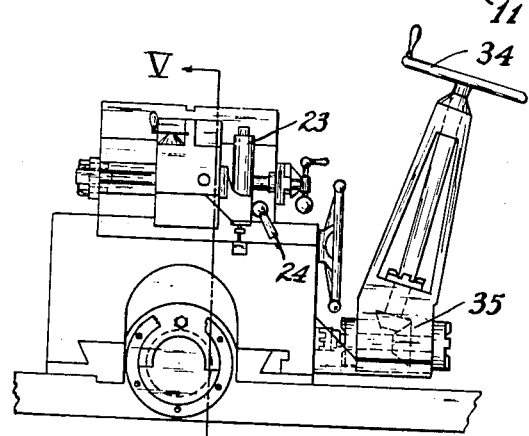
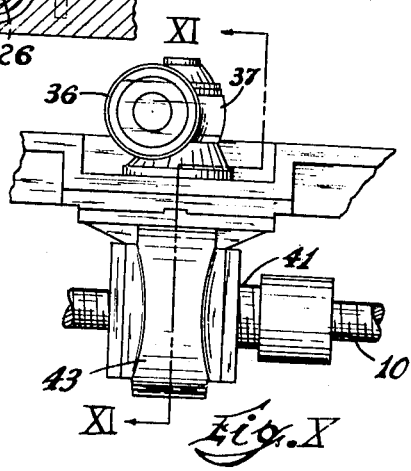

Jan. 24, 1956
G. BREZA ET AL
2,731,869
CONTROLLING AND COMPENSATING APPARATUS FOR LATHES AND THE LIKE
Filed March 6, 1951
6 Sheets-Sheet 4
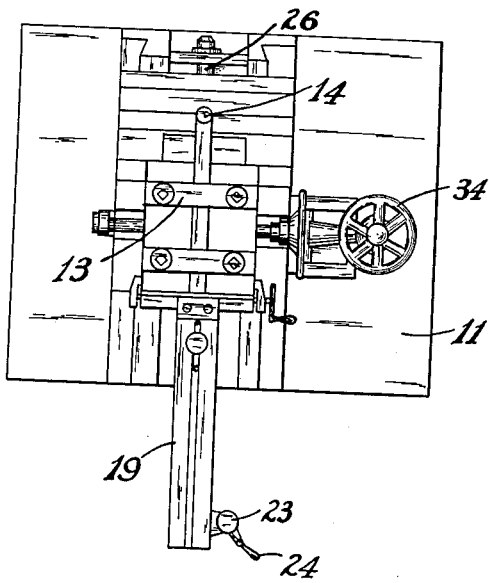
Fig. VIII
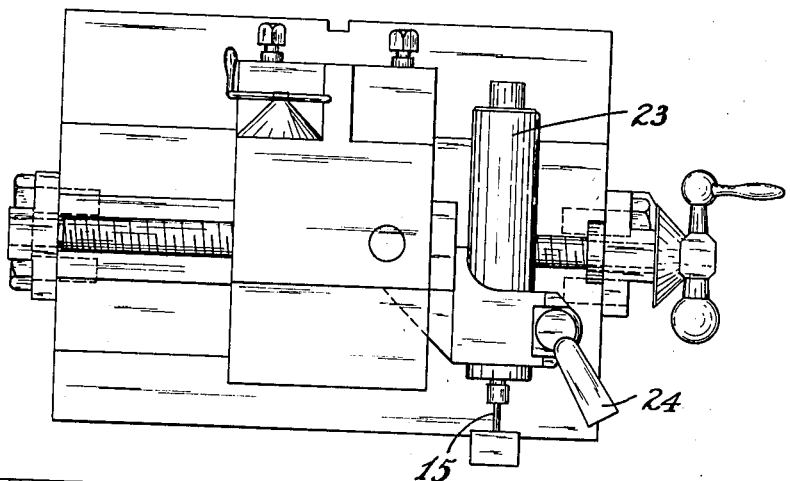
Fig. IX
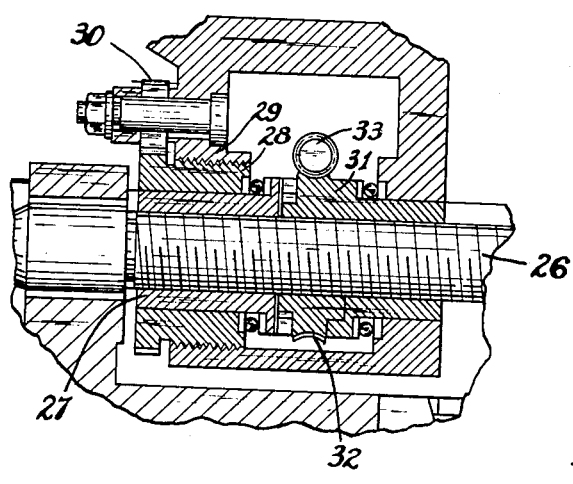
Fig. VII
INVENTORS
George Breza AND
Finn B. Abramsen
by William B. Wharton
Their Attorney

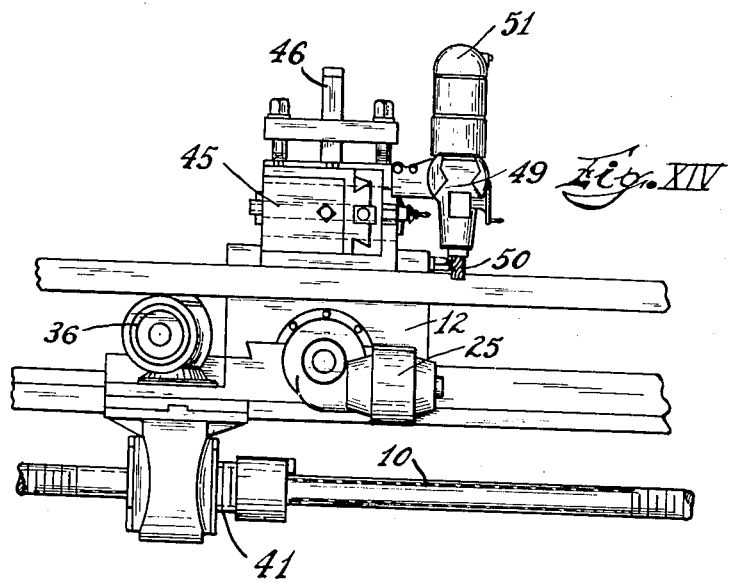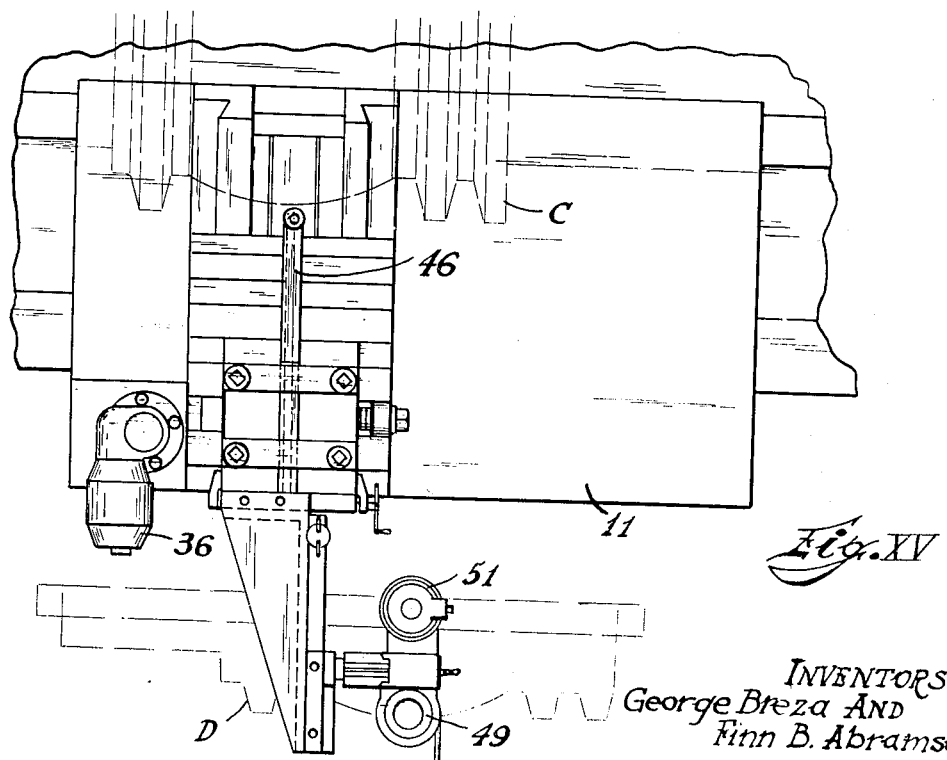

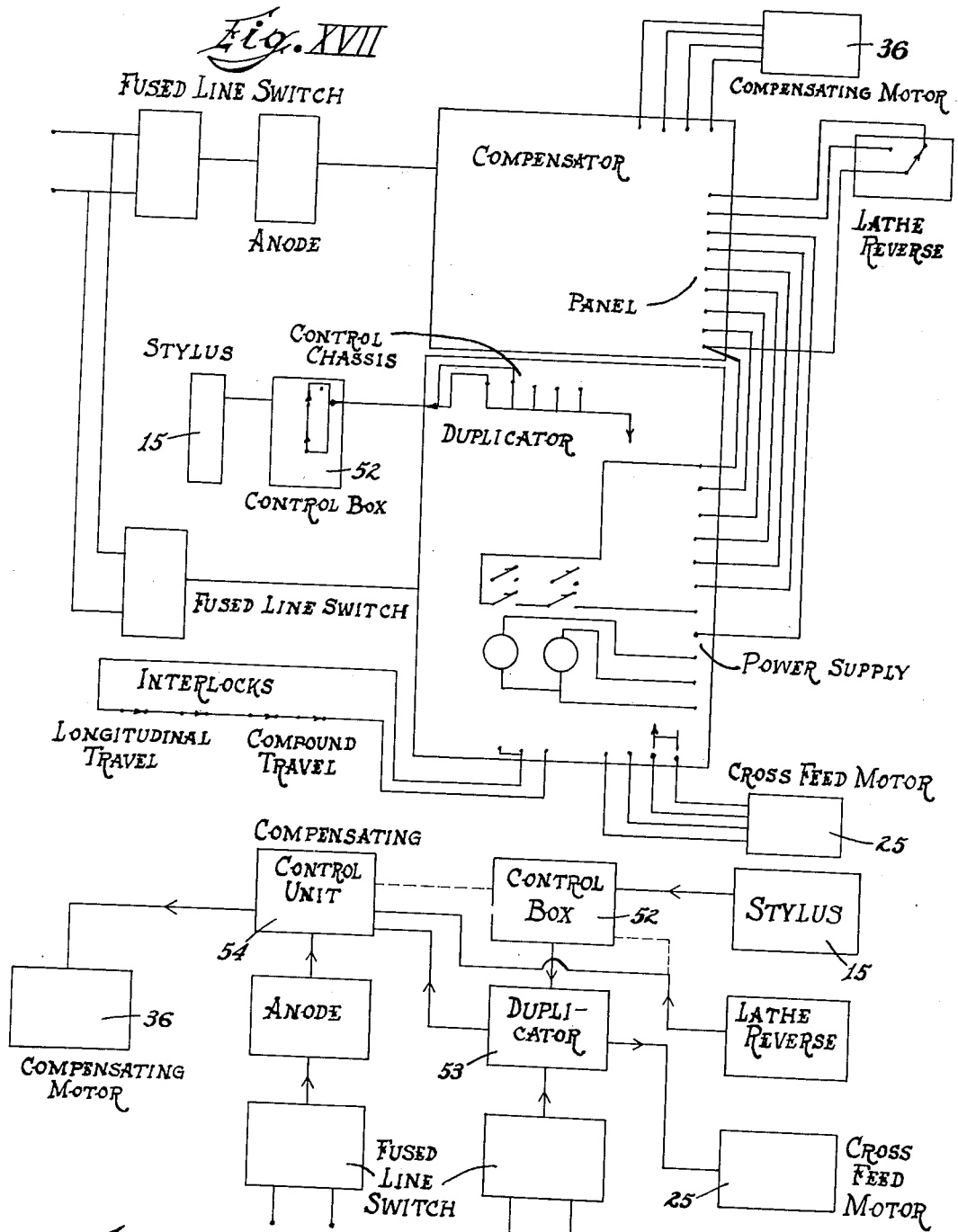

United States Patent Office 2,731,869
Patented Jan. 24, 1956

2,731,869

CONTROLLING AND COMPENSATING APPARATUS FOR LATHES AND THE LIKE

George Breza, Baldwin, and Finn B. Abramsen, Whitehall, Pa., assignors, by mesne assignments, to E. W. Bliss Company, Canton, Ohio, a corporation of Delaware Application March 6, 1951, Serial No. 214,172

4 Claims. (Cl. 82—14)

This invention relates primarily to a duplicating lathe of the sort which is adapted to the cutting of shaped articles of irregular contour such as collared rolls and the like under the guidance of a template or pattern.

The primary object of the invention is to provide a lathe of the sort described, which comprises cooperating elements of such sort that it is capable of rapidly and accurately forming with a minimum of repeated cutting operations an article such as a collared roll with cutting at various angles prescribed by the desired form of the roll and incorporated in a template or pattern; to give a finished product.

A more specific object of the invention is to effect the above object while operating the primary means for driving the lathe carriage longitudinally at constant speed and accurately correlating a modified longitudinal speed of the lathe carriage to the transverse feed of the carriage to produce a variable and coordinated result which performs the work in superior manner.

Another object of the invention is to attain the above described results without the use of complicated clutch and gear mechanism and without the necessity of repeated adjustments requiring interruption of the work.

Another object of the invention is to provide a lathe in which the longitudinal speed of the carriage and the transverse feed are so correlated that a substitution of cutting agencies enables the lathe without other alterations to be used for cutting a template from a preformed roll used as a pattern.

These objects we attain by providing a lathe of the sort in which the cross-feed is performed under electronic control of a tracer operating on a template; in which lathe the longitudinal feed is transmitted to the lathe carriage by way of variable compensating means acting in cooperation with power-transmitting means such as a screw driven at constant speed, such compensating means being also controlled electronically by the tracer in contact with the template.

In the accompanying drawings exemplary of the embodiment of my invention:

Fig. I is a plan view of the mechanical assembly of a lathe comprising the elements of my invention.

Fig. II is a front elevation of the lathe shown in Fig. I.

Fig. III is a cross-sectional view taken in the plane of the section line III—III of Fig. I and showing the lathe carriage and its associated elements of the lathe in side elevation, together with a steady rest of conventional construction not shown elsewhere in the drawings.

Fig. IV is a front elevation of the cross-slide and its associated elements.

Fig. V is a cross-sectional view through the cross-slide taken in the plane of the section line V—V of Fig. IV.

Fig. VI is a longitudinal sectional view through the cross-slide taken in the plane of the section line VI—VI of Fig. V.

Fig. VII is a detail view of driving elements of the cross-slide which are shown on a smaller scale in Fig. V.

Fig. VIII is a plan view of the cross-slide, the tool and tracer or stylus rest and their associated elements.

Fig. IX is a front elevational view on an enlarged scale showing the tool and stylus rest and its associated elements.

Fig. X is a detail front elevation showing the compensating elements for modifying longitudinal travel of the lathe carriage associated with the power screw of the lathe.

Fig. XI is a detail cross-sectional view taken in the plane of the section line XI—XI of Fig. X.

Fig. XII is a detail longitudinal sectional view of the compensating attachment to the power screw, taken apart from other elements of the lathe assembly.

Fig. XIII is a cross-sectional view taken on the same plane III—III of Fig. I as in Fig. III, but showing a substituted tool and stylus rest provided with a milling cutter to cut a template from a sample roll used as a pattern.

Fig. XIV is a front elevational view of the lathe carriage and cross-slide, the cross-slide being equipped with a tool and stylus rest carrying a milling cutter as in Fig. XIII.

Fig. XV is a plan view of the assembly shown in Fig. XIV.

Fig. XVI is a schematic diagram of the cable connections for controlling the cross-slide motor and the compensating motor of the lathe from the stylus.

Fig. XVII is a schematic and simplified wiring diagram of the connections of the stylus with an electrical line circuit and the cross-slide motor and compensating motor of the lathe.

It should be understood that to avoid unnecessary duplication not every element shown in some one or more figures of the drawings is repeated in every figure.

In the embodiment of our invention as herein shown, the lathe comprises a frame forming the lathe bed 1. The work supports of the lathe comprise a center 2 carried by tailstock 3 and a center 4 on face plate 5 rotated from head stock 6 containing connections driven by motor 7. Driving connections 8 comprising speed-reducing and clutching means 9 transmit power from head stock 6 to power screw 10. A lathe carriage 11 is movable longitudinally of lathe bed 1 and carries a cross-slide 12 which is transversely movable on carriage 11 and which carries a tool and stylus rest 13. Tool and stylus rest 13 carries a cutting tool 14 to act on a workpiece shown as a roll blank A and an electronically connected tracer in the form of the stylus 15 adapted to follow the contour of a template B held in a template holder 16.

In detail, the tool and stylus rest 13 is adjustable longitudinally of the lathe bed by means of a sliding connection with cross-slide 12. Adjusting movement of the assembly is produced by a hand-operable screw 17 acting on nut 18 connected with the tool and stylus rest. The stylus support 19 is adjustable in tool and stylus rest 13 longitudinally of the lathe bed by a hand-operable screw 20 which acts on nut 21 connected with the tool and stylus rest. Stylus support 19 carries a hand-operable screw 22 which in turn carries the stylus follower 23. By means of hand-operable screw 22 stylus follower 23 can be brought into position with stylus 15 in contact with template B. The stylus follower and stylus are held in a position of vertical adjustment by latch 24.

With the tool 14 and stylus 15 in proper adjustment with respect to the roll blank A and template B respectively, the stylus follows the contour of the template, the action being by means of a "Raytheon" electronic duplicator which acts continuously, instantly to correct any tendency of the stylus to leave the template as the cutting action proceeds. It is to be understood that the tool and stylus rest 13, the stylus support 19 and stylus follower 23 carrying stylus 15, together with cross slide 12, all are adjusted relatively to each other in all directions, initially to bring both stylus 15 and cutting tool 14 into contact with the template and work respectively.

In normal power operation of the lathe, cross-slide 12 is driven under stylus control by motor 25. As shown in Figs. V, VI, VII, threaded shaft, or screw, 26 acts on a nut 27 connected with the cross-slide for its propulsion. The assembly includes take-up sleeve 28 which is externally threaded to threaded region 29 of cross-slide 12 and which is acted on by pinion 30 to tighten the connection. Externally, a second nut 31 is toothed as a worm wheel in its region 32 to cooperate with worm 33 which is rotatable by hand wheel 34 through connections 35. This latter means serves to bring the cutting tool initially into contact with the work and to make a straight entry of the cutting tool by hand when such action is desired. Otherwise cross-slide 12 is moved transversely of the lathe bed under power derived from motor 25.

It will be understood readily that rotation of power screw 10 under power derived from main motor 7 through head stock 6 propels the lathe carriage as a whole longitudinally of the lathe bed in accordance with the connection of the power screw with the head stock and the rotational speed imparted to the power screw thereby. Thus simple movement of the lathe carriage 11 moves cutting tool 14 longitudinally of the work. Movement of cross-slide 12 transversely of the lathe bed correspondingly causes cutting movement of cutting tool 14 into the roll being turned. For this movement, as noted above, power is provided by cross-slide motor 25 to move the cutting tool in a straight transverse line when the power screw is disconnected or to produce a taper cut during intervals of combined longitudinal and transverse movement. Without more, however, there is no correlation between the longitudinal feed and the cross-feed to cause the cutting tool to follow a pattern of any selected contour.

It is necessary, therefore to correlate the longitudinal feed of the lathe carriage to the movement of the cross-slide in some manner. When the cross-feed is controlled by the contact of a stylus with a template, correlation between longitudinal feed and cross-feed usually is effected by regulating the rotational speed of the power screw. Where this has been done by mechanical means as by the manual or electro-mechanical operation of clutches and the like, the cutting action tends to be irregular necessitating a plurality of finishing cuts. Also the cutting action is slow and in following some patterns it is necessary to repeat the operation in a reverse direction.

This problem we have solved by combining with a stylus-controlled cross-feed a driving member rotated at constant speed and variable speed modifying means connecting the constant speed driving means with the lathe carriage; and then have placed the speed-modifying means for the driving means likewise under control of the template-contacting stylus which controls movement of the cross-feed.

A specific embodiment of compensating means for modifying the effect of rotation of a power screw on longitudinal movement of the lathe carriage is shown in most figures of the drawings and is shown in detail in Figs. X, XI, and XII thereof. The compensating means herein shown comprise a variable speed motor 36 the energization of which is under control of stylus 15 and which acts through a speed-reducing assembly 37 on vertical worm shaft 38. Shaft 38 carries a worm 39 meshing with a worm wheel 40 on a nut 41 which has threaded engagement with power screw 10. A wear-compensating sleeve 42 is threaded to power screw 10 and nut 41. A housing 43 engages nut 41 with lathe carriage 11 and encloses worm 39, worm wheel 40 and anti-friction bearing 44 which surrounds nut 41.

Since compensating nut 41 is the element which is in direct engagement with lathe carriage 11, longitudinal movement of the carriage conforms to movement of the nut 41 on the power screw rather than to the direct action of the power screw 10. Bearing in mind that power screw 10 may be and desirably is rotated at constant speed during each operation of the lathe, the longitudinal movement of the nut 41 on the power screw 10 and of the lathe carriage 11 longitudinally of the lathe bed is the resultant of power screw rotation and nut rotation. The value of this resultant can be from a zero or negative value at which the nut 41 and carriage 11 have no longitudinal movement or a reverse movement with respect to the power screw 10, up to a value at which the longitudinal speed imparted to the lathe carriage is unaffected by action of the compensating nut. In the first instance the compensating nut 41 is rotated at an equal or greater speed than the rotational speed of the power screw 10 and in the latter instance the nut 41 is not rotated. Between these extremes the compenasting nut 41 by rotating at slower speed than the power screw 10 imparts to the carriage 11 longitudinal feed slower than would be imparted by direct engagement between the power screw and the carriage.

It should be understood that the action of compensating nut 41 is variable throughout its entire range under the control of stylus contact with template B, motor 36 being a sensitive variable speed motor. Since cross-feed motor 25, also under stylus control, is a sensitive reversing motor, the control acts rapidly to give a cut of increased accuracy and smoothness throughout all variations of template contour. The cutting thus depends on stylus and template control of cross-feed and a similar control of the longitudinal feed, the latter involving the use of variable compensating means directly connected with the lathe carriage which avoids necessity for varying the rotational speed of the power screw itself. It will be understood readily that the inclusion of such variable compensating means not only simplifies the lathe structure greatly but also greatly increases the sensitivity of the lathe in accurately following the template contour.

The stylus 15 and its associated elements of the stylus, or tracer, assembly may be described as omni-directional. That is the organization is sensitive to deflecting pressure on the stylus from any direction about its axis. Under normal operating conditions the stylus is deflected to form a slight angle with its natural axis by pressure against the template. If this angle is decreased by a minute value, the cross-slide drive motor 25 will be energized by the electronic control and the pressure between the stylus and the template will be maintained continuously. This same impulse serves to energize the compensating motor 36 which acts to subtract from the fixed longitudinal feed an amount equal to that imparted to the cross-slide feed. In like manner, if the deflection angle of the stylus is increased by a minute amount the cross slide motor 25 is energized by the electronic control. The increase of stylus pressure delivers current of opposite polarity, causing the cross-slide motor to retract the cross-slide thus maintaining a fixed pressure between the stylus and template. This same impulse serves to energize the compensating motor associated with the longitudinal feed as before, without change in polarity.

It will be noted that the stylus-operated electronic control apparatus controls both the magnitude and direction of the cross-feed, but controls only the magnitude of the longitudinal feed compensation. Because of the nature of the control with its inherent smoothness and accuracy of cutting at all angles, it is possible to use the lathe with but slight structural change to cut a template from a premade roll used as a pattern. The structural arrangement for so doing is shown in Figs. XIII, XIV and XV of the drawings. In making the adaptation to this inverted use it is necessary merely to remove cutting tool 14 and stylus support 19 from tool and stylus rest 13 and to equip the tool and stylus rest with instrumentalities of different sort. Thus the cutting tool is replaced by a bracket 46 which carries a stylus follower 47 and stylus 48, the bracket being mounted to bring stylus 48 into contact with the roll C which serves as a pattern. At the outer end of tool and stylus support 13 there is a milling cutter 49 which brings a milling tool 50 into contact with a template blank D carried by template holder 16. Milling cutter 49 is rotated at constant relatively slow speed by an independently energised motor 51.

Figs. XVI and XVII of the drawings illustrate in a schematic and simplified manner the connection of an adapted "Raytheon" duplicator assembly to control simultaneously the cross-feed and longitudinal feed of the cutting tool. Fig. XVI shows the connection of stylus 15 through a control box 52 and duplicator 53 with cross-feed motor 25 and a control unit 54 for compensating motor 36, tying both cross-feed and longitudinal feed to the effect of the stylus. The same organization with somewhat more wiring detail is shown in Fig. XVII illustrative of the stylus control.

The result of the lathe organization and the control of its cutting action can be explained as follows:

In the event that a straight longitudinal cut is being made, the stylus will follow a straight line contour of the template with no tendency to depart from contact with it until the rotation of the roll blank and travel of the lathe carriage has completed removal of metal from the area of the roll blank in which such cut is to be made. In this cutting action the speed of longitudinal feed is the basal speed of the power screw. If, however, the contour to be followed becomes angular or curved, the tendency for the stylus to leave the template is overcome in the manner described above. The effect of this compensation is instantaneous, so that the resulting cut gives a minimum of irregularity and a maximum of smoothness to the surface of the work-piece on which the cutting is performed. Such work-piece has been referred to specifically herein as a roll blank because rolls are articles of general use in the manufacture of which the lathe of our invention presents particularly great advantage. It is to be understood, however, that the work-piece may be any article which is to be cut to a specific contour.

Certain general advantages of our lathe may be noted. The fact that the power screw may rotate at constant speed gives a maximum speed of longitudinal carriage travel subject to modification by the action of the compensating means. Because of the fact that the compensating nut transmits from the power shaft to the carriage modified speed of any desired value the lathe is greatly simplified in structure, as well as being rendered accurate in operation. Also this compensation avoids necessity for frequent speed adjustment of the power screw as by change gears, clutches or the like mechanical means. The greatest advantage of our lathe resides in the ease, accuracy and smoothness of the cutting operation which it performs. Another significant advantage of our lathe control is the fact that there are no limitations as to the contour which the lathe is capable of turning, the rate of speed along the contoured surface being relatively constant. In practical effect this rate of feed in the lathe in which our invention has been physically embodied varies from the selected longitudinal feed to 1.414 times that selected feed.

In essence our invention consists in applying to a machine tool (as specifically illustrated and described a lathe) in which feed in at least one dimension is controlled both as to direction and magnitude and in which feed in one other dimension is controlled as to magnitude alone the latter control being attained by compensating the constant rotational speed of a driving element, and in which both controls are actuated by impulses initiating from a single tracer in contact with a form. With this understanding it will be clear that compensating means other than the compensating nut shown and described may be placed under control of the tracer without departing from the spirit of our invention. Also the control assembly is susceptible of incorporation in a machine tool other than a lathe, to give an automatic control of the machine's cutting action in accordance with the contour of a form.

We claim as our invention:

1. In a lathe comprising a frame, a carriage movable linearly on said frame, a power-screw driven at a selected constant speed for propelling said carriage, a cross-slide in said carriage and traversable angularly to the direction of travel of said carriage; electrical tracer control comprising in combination a compensating nut on said power-screw and connected with said carriage acting by its rotation to modify longitudinal propulsion of said carriage by said power-screw without alteration in the speed of the power screw, a variable speed longitudinal speed modifying motor for rotating said compensating nut, a reversible motor for traversing said cross-slide at variable speed, a tracer mounted on said cross-slide to follow the contour of a form, and electrical means controlling simultaneous coordinated energization of said compensating motor and said cross-slide motor both from said tracer, the said electrical means acting under the effect of a single signal therefrom, in correspondence with the magnitude of energization of the said reversible motor with equal magnitude to energize the compensating motor to modify the effect of the constant speed of the said power-screw.

2. In a lathe comprising a frame, a carriage movable linearly on said frame, a rotatably driven member for propelling said carriage, a cross-slide in said carriage and traversable angularly to the direction of travel of said carriage; the combination of a motor arranged to actuate the said member for propelling the said linearly movable carriage at a selected constant speed, mechanical compensating means connecting said carriage with said rotatably driven member effectively to transmit modified propulsion from the said rotatably driven member to the carriage without alteration in the speed of said rotatably driven member, a variable speed carriage feed modifying motor arranged to act on said mechanical compensating means, a reversible motor for traversing said cross-slide at variable speed, a tracer mounted on said cross-slide to follow the contour of a form, and electrical means controlling the simultaneous coordinated energization of said compensating motor and said cross-slide motor both from said tracer, the said electrical means acting under the effect of a single signal therefrom, in correspondence with the magnitude of energization of the said reversible motor with equal magnitude to energize the compensating motor to modify the effect of the constant speed of the said rotatably driven member.

3. In a machine tool a controlling and compensating assembly comprising two rotatable driving members in mutually angular relation, two driven carriage structures associated each with one of said driving members, a motor arranged to actuate one of said driving members at a selected constant speed, mechanical compensating means connecting the said driving member with its associated carriage and constructed to impart modified propulsion to said carriage without alteration in the speed of said driving member actuated at selected constant speed, a variable speed motor arranged to act effectively on said compensating means, a reversible motor arranged to act effectively on said second rotatable driving member to propel the carriage associated therewith at variable speed, a tracer mounted to follow the contour of a form in movement of the said carriages, and electrical means controlling the simultaneous coordinated energization of the said compensating motor and the said reversible motor both from said tracer, the said electrical means acting under the effect of a single signal therefrom, in correspondence with the magnitude of energization of the said reversible motor with equal magnitude to energize the compensating motor to modify the effect of the said constant speed driving member.

4. In a machine tool a controlling and compensating assembly comprising a power screw driven at a selected constant speed and a secondary screw in mutually angular relation, two driven carriage structures associated each for propulsion with one of said screws, a compensating nut connecting the said power screw with its associated carriage and constructed to impart modified propulsion to said carriage without alteration in the speed of the power screw, a variable speed motor arranged to act effectively on said compensating nut, a reversible motor arranged to act effectively on said secondary screw to propel the carriage associated therewith at variable speed, a tracer mounted to follow the contour of a form in movement of the said carriages, and electrical means controlling the simultaneous coordinated energization of the said compensating motor and the said reversible motor both from said tracer, the said electrical means acting under the effect of a single signal therefrom, in correspondence with the magnitude of energization of the said reversible motor with equal magnitude to energize the compensating motor to modify the effect of the constant speed of the said power screw.

References Cited in the file of this patent

UNITED STATES PATENTS

| | | |
|---|---|---|
| 658,540 | Buhne et al. | Sept. 25, 1900 |
| 2,116,593 | Bouvier et al. | May 10, 1938 |
| 2,388,555 | Kuehni et al. | Nov. 6, 1945 |
| 2,476,214 | Parsons | July 12, 1949 |
| 2,492,731 | Branson | Dec. 27, 1949 |
| 2,559,575 | Fryklund et al. | July 3, 1951 |